Oct. 7, 1924.
A. T. BROWN ET AL
1,511,024
MOTOR AGRICULTURAL MACHINE
Filed Dec. 16, 1921  5 Sheets-Sheet 1
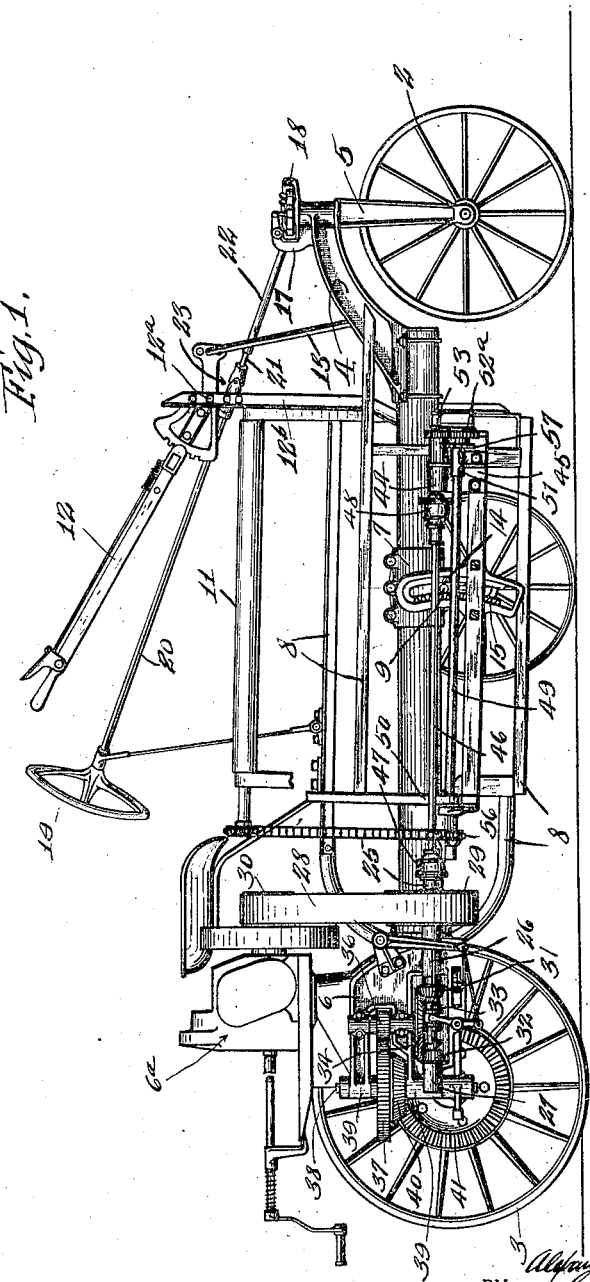
INVENTORS
Alexander T. Brown
BY and Charles F. Brown
Parsons & Bodell
ATTORNEYS.

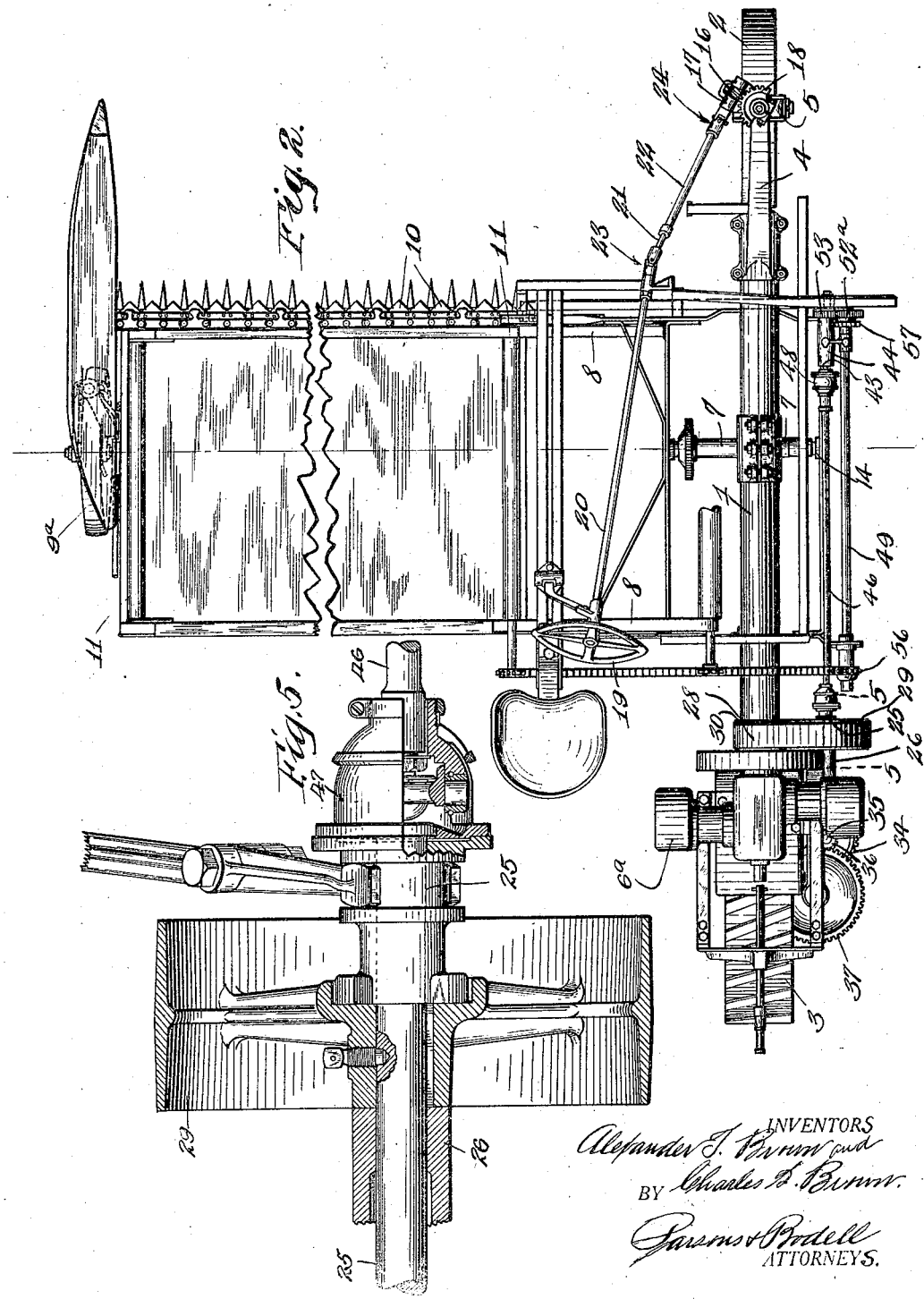

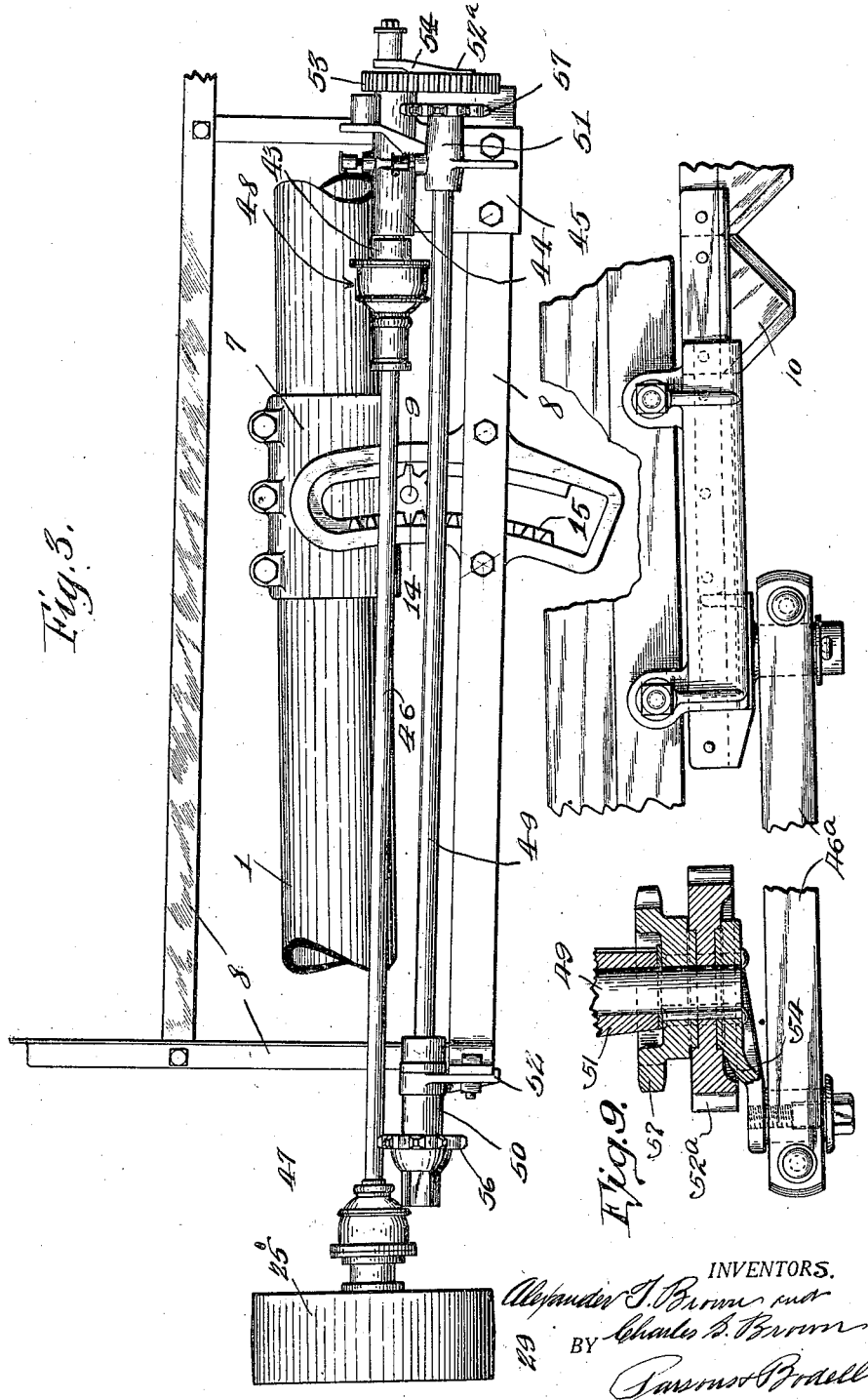

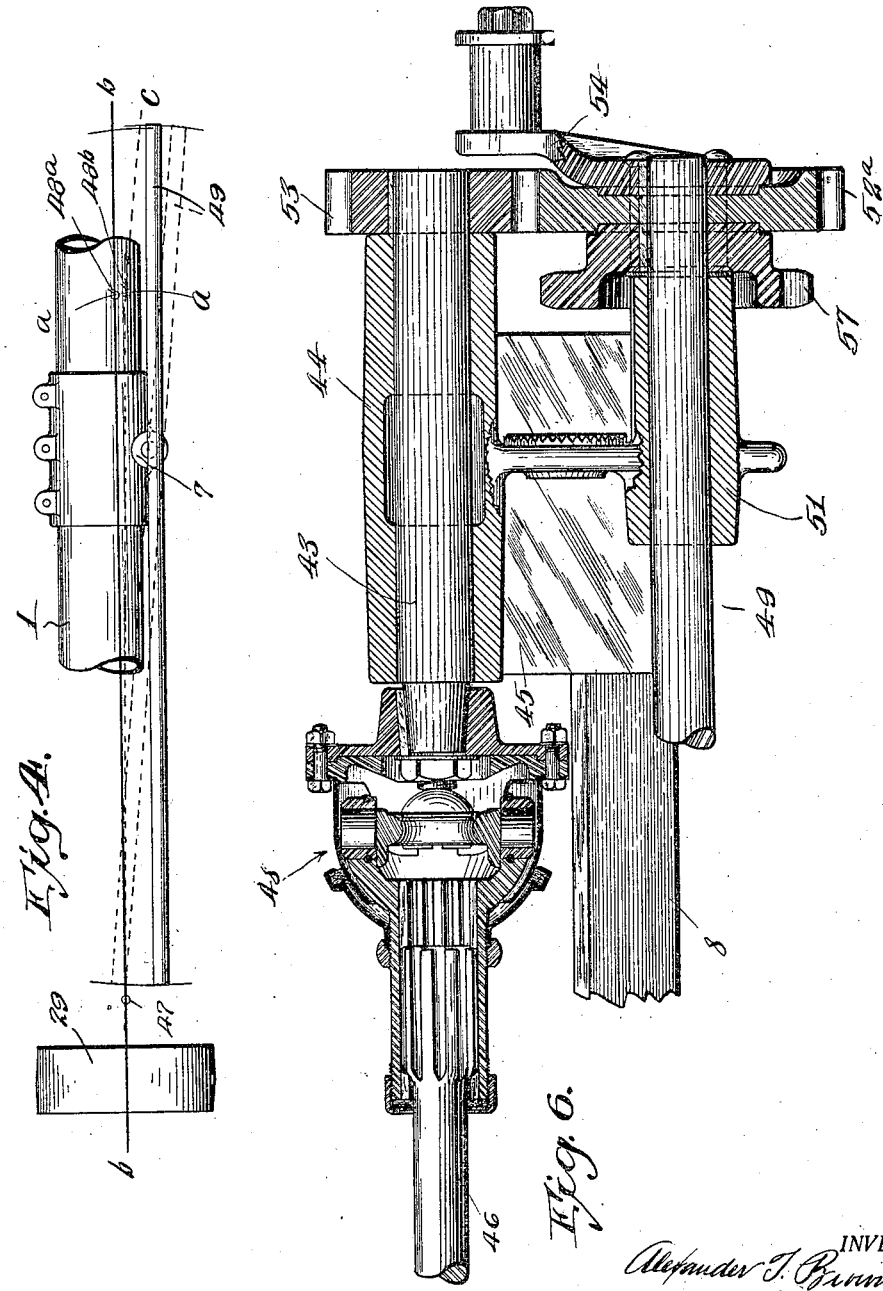

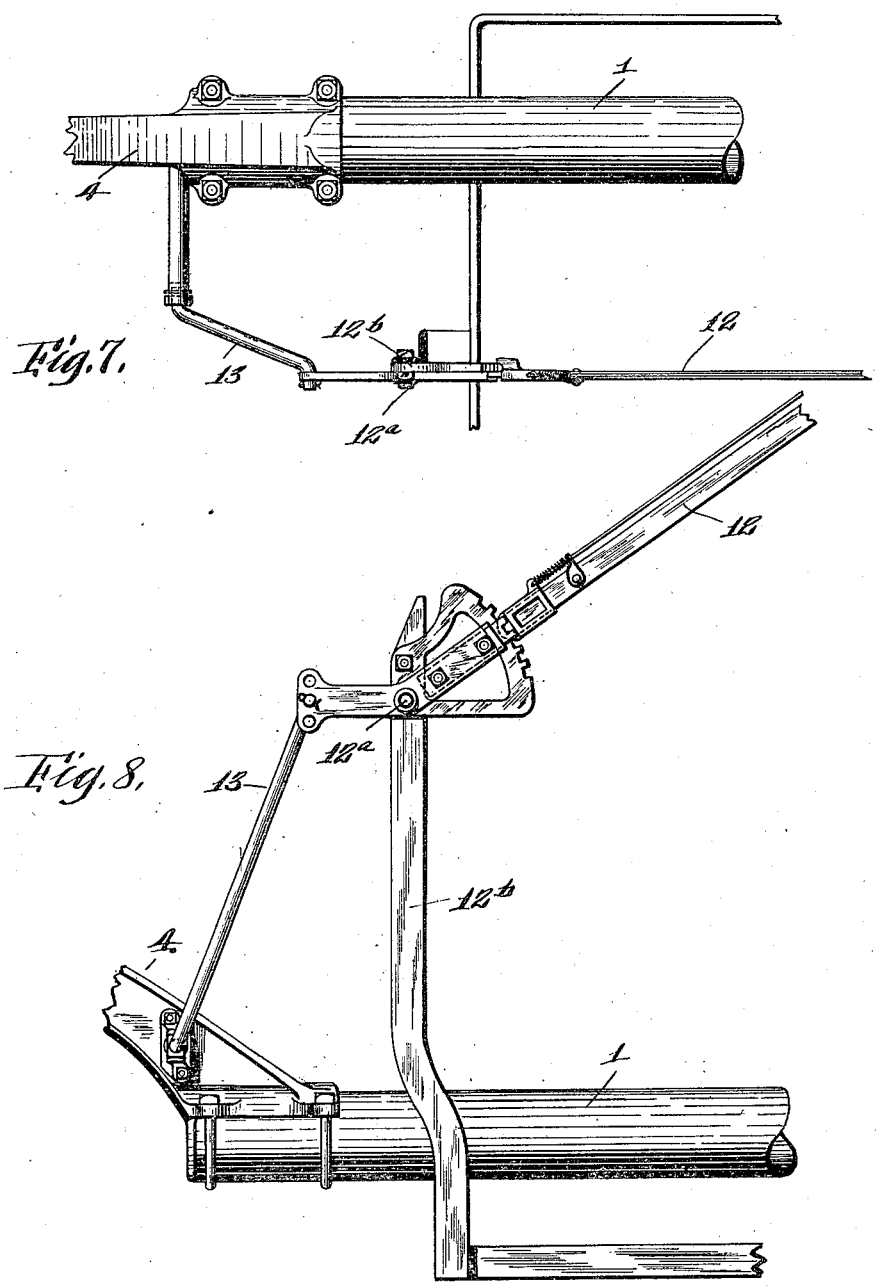

Patented Oct. 7, 1924.

1,511,024

UNITED STATES PATENT OFFICE.

ALEXANDER T. BROWN AND CHARLES S. BROWN, OF SYRACUSE, NEW YORK.

MOTOR AGRICULTURAL MACHINE.

Application filed December 16, 1921. Serial No. 522,891.

*To all whom it may concern:*

Be it known that we, ALEXANDER T. BROWN and CHARLES S. BROWN, citizens of the United States, and residents of Syracuse, in the county of Onondaga and State of New York, have invented a certain new and useful Motor Agricultural Machine, of which the following is a specification.

This invention relates to motor agricultural machines as a motor binder or harvester, and has for its object a particularly simple and efficient arrangement of the power transmitting mechanism between the drive shaft carried by the main frame of the machine and the movable part of the harvester carried by the implement frame, relatively to the tilting axis of the implement or harvester frame. The invention consists in the novel features and in the combinations and constructions hereinafter set forth and claimed.

In describing this invention, reference is had to the accompanying drawings in which like characters designate corresponding parts in all the views.

Figure 1 is a side elevation of a machine embodying our invention, parts being omitted.

Figure 2 is a plan view of parts seen in Fig. 1.

Figure 3 is an enlarged fragmentary elevation of the power transmitting mechanism and contiguous parts, shown in Fig. 1.

Figure 4 is a diagrammatic view showing the position of the shafts of the power transmitting mechanism relatively to the axis of the implement frame when tilted into different positions.

Figure 5 is an enlarged sectional view approximately on line 5—5, Fig. 2.

Figure 6 is an enlarged sectional view, partly in elevation, through the front bearings for the driven and counter shafts, and contiguous parts.

Figure 7 is an enlarged plan view of the lever for tilting the binder relatively to the chassis or tractor frame.

Figure 8 is an elevation of parts seen in Fig. 7.

Figure 9 is an enlarged fragmentary plan view, partly in section of parts seen at the right end of Fig. 3, the reciprocating knife and pitman between such parts and the knife.

This machine comprises generally, a main frame and implement mounted on the main frame to tilt about a transverse horizontal axis, movable parts carried by the implement frame, and a motor and power transmitting mechanism between the motor and such movable parts of the implement.

1 designates the main frame, and 2 and 3 front and rear wheels supporting the main frame, one of these wheels as the front wheel 2 being a steering wheel, and the other, the rear wheel 3 being a tractor wheel. The tractor wheel is also mounted to swivel about an upright axis to manœuvre the machine when turning corners in a field when the machine is in operation harvesting a crop. As here illustrated, the main frame includes a lengthwise beam having a bracket 4 at its front end in which the fork 5 for the steering wheel 2 is mounted, and a bracket 6 at its rear end on which the tractor wheel and its actuating and control mechanism is supported. The beam is also provided with a transverse bearing 7, Figs. 2 and 4 between its ends for receiving the spindle of the implement frame on which spindle is ordinarily mounted on the main wheel of a horse drawn binder.

8 designates the frame of the binder which has the spindle 9 on one side mounted in the bearing 7 of the main frame and a grain wheel 9ª mounted in line with the bearing 7. The implement includes movable parts as the usual reciprocating knife 10 and aprons or conveyors movable over rollers as 11 which are actuated by the power transmitting connections hereinafter described. The implement is tiltable about the axis of the bearing 7 and grain wheel 9ª by any suitable mechanism operated by the lever 12, Figs. 1, 7 and 8 pivoted at 12ª to a bar 12ᵇ extending upwardly from the implement frame, and a connection as a link 13 between the lever and the main frame, and the implement frame is also shiftable bodily upwardly or downwardly in any well known manner as by turning the pinion 14 at one end of the spindle 9 which pinion 14 meshes with a rack as 15 on the implement frame, and a similar means associated with the grain wheel 9ª. The means for raising and lowering an implement frame is old and well known. A similar well known means is used in connection with the grain wheel.

The construction thus far described forms no part of this invention. The main frame and manner of mounting the implement thereon constitute the subject matter of the application of Alexander T. Brown, Sr. No. 315,003, filed August 2, 1919.

The grain wheel 9ª is a caster wheel normally arranged with the axis of the wheel, in alinement with the tilting axis of the binder frame, that is, the axis of the spindle 9. This feature constitutes the subject matter of another application.

The front or steering wheel 2 or the fork 5 thereof is operated by means of a worm 16, Fig. 2, carried by a shaft journaled in an arm 17 on the bracket 4 and meshing with a segment 18 on the upper end of the fork 5, a hand wheel 19 mounted on a shaft 20 suitably supported by the implement frame and an intermediate shaft consisting of telescoping sections 21, 22 connected respectively by universal joints 23, 24 to the shaft 20 and the worm shaft.

The power transmitting connections for driving the movable parts of the implement as the knife 10 and rollers 11 for the aprons and conveyors, comprise a driving element or shaft 25 carried by the main frame, a driven shaft as 43 carried by the implement frame 8, an intermediate shaft 46 connected at its ends by universal joints to the driving and driven shafts and a countershaft 49 carried by the implement frame and geared to the driven shaft. The intermediate and the countershaft extend crosswise of the axis of the bearing 7 and the driving and driven shafts are on the rear and front ends of the intermediate shaft.

25 is the driving shaft which is journaled in bearings 26, 27 carried by the bracket 6 at the rear end of the frame, this shaft being connected to the crank shaft of the motor 6ª by suitable means here shown as a belt 28 running over pulleys 29, 30 on the shaft 25 and the crank shaft. The shaft 25 is also connected to the tractor wheel 3 through suitable gearing consisting of one or the other of the bevel pinions 31, 32 loosely mounted on the shaft 25 and connectible selectively thereto by a slidable clutch 33, and a bevel gear 34 mounted on an upright shaft 35 journaled in the bracket 6, the gear 34 meshing with the pinions 31, 32, a gear 36 mounted on the upper end of the upright shaft 35, and a gear 37 mounted loosely on a second upright shaft 38, Fig. 2, mounted in bearings 39 on the rear bracket, the gear 37 meshing with the gear 36, and a bevel gear 40 fastened to the gear 37 and rotating on the shaft 38 and meshing with a bevel gear ring 41 on the tractor wheel, which wheel is mounted on an axle extending laterally from the lower end of the shaft 38. The operation of the tractor wheel and the gearing for driving and turning, or swiveling it, forms no part of this invention.

43, Figs. 1, 3 and 6 is the driven shaft which is journaled in a bearing 44 provided in a bracket 45 secured to the front right hand corner of the implement frame 8 in front of the transverse bearing 7.

46 is the intermediate shaft connected at its rear and front ends by universal joints 47, 48 to the driving shaft 25 and driven shaft 43, the universal joint 48 being located in front of the transverse bearing 7 or tilting axis of the implement frame 8, and the universal joint 47 being located in the rear of said bearing.

49 is the countershaft journaled in bearings 50, 51 provided respectively in a bracket 52 at the rear right hand corner of the frame 8 and in the bracket 45 below the bearing 44, and connected to the driven shaft 43 by intermeshing gears 52ª, 53 on such shafts. The countershaft 49 is also provided with suitable means for transmitting motion to the movable parts of the implement as a crank 54 on the front end of the shaft 49 for connection through the usual pitman 46ª to the reciprocating knife 10, and a sprocket wheel near its rear end for receiving a belt or chain which actuates the rollers over which the aprons run, and a sprocket wheel 57 near its front end over which a chain or belt runs for actuating the binder or knot tying mechanism, as will be understood by those skilled in the art. The shaft 46 is connected to one of the universal joints 47, 48, here shown as the joint 48 by a sliding connection, Fig. 6.

In operation, during tilting of the implement frame 8 about the axis 7, the driven and countershafts 43 and 49 also move therewith about such axis, the countershaft moving as indicated in dotted lines, Fig. 4, and the intermediate shaft 46 moves about the axis of the rear universal joint 47, and the front end moves in the arc $a$—$a$, Fig. 4, the position of the axis of the front universal joint 48, when in its extreme positions, being indicated by the circles 48ª, 48ᵇ, Fig. 4. When the implement frame is level the shafts 25, 43 are practically level and the shaft 43 is either in line with or parallel with the line $b$—$b$, Fig. 4, and when the frame 8 is tilted downwardly, the intermediate and driven shafts 46, 43 are in the lines $b$—48ᵇ, 48ᵇ—$c$, Fig. 4. In short, when the implement is level, the driving shaft 25 and driven shaft 43 are either in alinement or located in parallel lines, and during the tilting movements the change in the angular position of the driving shafts 43 and intermediate shaft 46, is slight.

Owing to the arrangement of the shafts 25, 43 and 46 and the universal joints 47 and 48, relatively to the tilting axis 9 of the implement frame, the angle between the shafts 46, 43 during tilting of the frame 8 about the axis 9 is equal, or nearly equal to the angle between the shafts 25 and 46, and hence the motion transmitted by these shafts and universal joints is substantially uniform.

What we claim is:

1. In a motor agricultural machine, a main frame, wheels supporting the main frame, an implement comprising a frame and movable parts carried thereby, the implement frame being mounted on the main frame to tilt about an axis, a motor mounted on the main frame and power transmitting connections between the motor and the movable parts of the implement comprising a drive shaft carried by the main frame on one side of the axis of the implement frame, a driven shaft carried by the implement frame on the other side of said axis, an intermediate shaft connected to the former shafts by universal joints, substantially as and for the purpose described.

2. In a motor agricultural machine, a main frame, wheels supporting the main frame, an implement comprising a frame and movable parts carried thereby, the implement frame being mounted on the main frame to tilt about an axis, a motor mounted on the main frame and power transmitting connections between the motor and the movable parts of the implement comprising a drive shaft carried by the main frame on one side of the axis of the implement frame, a driven shaft carried by the implement frame on the other side of said axis, an intermediate shaft connected to the driving and driven shafts by universal joints, the universal joint between the intermediate shaft and the driven shaft being located between the axis of the implement frame and the driven shaft whereby there is a minimum angle between the intermediate and the driving and driven shafts during tilting of the implement frame, substantially as and for the purpose specified.

3. In a motor agricultural machine, a main frame, wheels supporting the main frame, an implement comprising a frame and movable parts carried thereby, the implement frame being mounted on the main frame to tilt about an axis, a motor mounted on the main frame and power transmitting connections between the motor and the movable parts of the implement comprising a drive shaft carried by the main frame on one side of the axis of the implement frame, a driven shaft carried by the implement frame on the other side of said axis, an intermediate shaft connected to the driving and driven shafts by universal joints, and a countershaft journaled in the implement frame, and means connecting the driven shaft and countershaft, substantially as and for the purpose set forth.

4. In a motor agricultural machine, a main frame, wheels supporting the main frame, an implement comprising a frame and movable parts carried thereby, the implement frame being mounted on the main frame to tilt about an axis, a motor mounted on the main frame and power transmitting connections between the motor and the movable parts of the implement comprising a drive shaft carried by the main frame on one side of the axis of the implement frame, a driven shaft carried by the implement frame on the other side of said axis, an intermediate shaft connected to the driving or driven shafts by universal joints, the universal joint between the intermediate shaft and the driven shaft being located between the axis of the implement frame and the driven shaft whereby there is a minimum angle between the intermediate and the driving and driven shafts during tilting of the implement frame, and a countershaft journaled in the implement frame, and means connecting the driven and countershafts, substantially as and for the purpose set forth.

5. In an agricultural machine, a main frame, wheels supporting the main frame, an implement comprising a frame and movable parts carried thereby, the implement frame being mounted on the main frame to tilt about an axis, a motor mounted on the main frame, and power transmitting connections between the motor and the movable parts of the implement comprising a drive shaft carried by the main frame on one side of the axis of the implement, a driven shaft carried by the implement frame on the other side of said axis, an intermediate shaft connected to the former shafts by universal joints located in front of and in the rear of said tilting axis of the implement frame whereby during tilting of the implement frame about its axis, the angle between the intermediate shaft and the driven shaft is approximately equal to the angle between the driving shaft and the intermediate shaft, substantially as and for the purpose described.

In testimony whereof, we have hereunto signed our names, at Syracuse, in the county of Onondaga, and State of New York, this 7th day of December, 1921.

ALEXANDER T. BROWN.
CHARLES S. BROWN.